US006483619B1

(12) United States Patent
Greywall

(10) Patent No.: US 6,483,619 B1
(45) Date of Patent: Nov. 19, 2002

(54) OPTICAL-INTERFERENCE MICROPHONE

(75) Inventor: Dennis Stanley Greywall, White House Station, NJ (US)

(73) Assignees: Lucent Technologies Inc., Murray Hill, NJ (US); Agere Systems Guardian Corp., Orlando, FL (US)

(*) Notice: Subject to any disclaimer, the term of this patent is extended or adjusted under 35 U.S.C. 154(b) by 0 days.

(21) Appl. No.: 09/133,028

(22) Filed: Aug. 12, 1998

(51) Int. Cl.[7] ........ H04B 10/00

(52) U.S. Cl. ........ 359/149; 359/150

(58) Field of Search ........ 359/149, 150, 359/173; 381/172

(56) References Cited

U.S. PATENT DOCUMENTS

| | | | | |
|---|---|---|---|---|
| 4,789,213 A | * 12/1988 | Heywang et al. | 350/96.15 |
| 4,933,545 A | * 6/1990 | Saaski et al. | 250/227.14 |
| 5,067,787 A | * 11/1991 | Gillham et al. | 385/50 |
| 5,262,884 A | * 11/1993 | Buchholz | 359/151 |
| 5,333,205 A | * 7/1994 | Bogut et al. | 381/172 |
| 5,910,855 A | * 6/1999 | Thomas | 359/285 |
| 6,014,239 A | * 1/2000 | Veligdan | 359/172 |
| 6,147,787 A | * 11/2000 | Veligdan | 359/150 |
| 6,154,551 A | * 11/2000 | Frenkel | 381/172 |

FOREIGN PATENT DOCUMENTS

| | | | |
|---|---|---|---|
| FR | 2607993 A1 | * | 6/1998 |
| GB | 2233467 A | * | 9/1991 |
| JP | 55-162700 A | * | 12/1980 |

* cited by examiner

*Primary Examiner*—Leslie Pascal

(57) ABSTRACT

An optical-interference microphone having a high sensitivity and bandwidth, and that is suitable to be manufactured by micromachining techniques. The microphone includes a back member, a diaphragm and an air gap formed between the back member and diaphragm. Further, the diaphragm includes a plurality of holes. The microphone utilizes optical interference to sense the sound-induced motion of the diaphragm. A light source and detector can be included as components of the microphone or can be at a remote location and connected to the microphone with an optical fiber.

8 Claims, 6 Drawing Sheets

OPTICAL-INTERFERENCE MICROPHONE

FIELD OF THE INVENTION

The present invention relates to the field of microphones, in particular to an optical-interference microphone.

BACKGROUND INFORMATION

A microphone is a transducer for converting acoustic energy into electrical energy. This electrical signal may have special applications, but generally will be converted back into ordinary sound. If the reproduced acoustic signal is to be sensed as an accurate copy of the original, the microphone should have a bandwidth and dynamic range mimicking that of the human ear. The stringency of these requirements can be appreciated by considering the fact that a soft whisper generates a pressure wave with an amplitude which is only a few parts in $10^{10}$ relative to atmospheric pressure, and that pain is incurred only when this amplitude is increased by a factor of $10^6$.

Conventional condensor microphones convert acoustic signals into electrical energy. However, conventional condensor microphones are relatively large in size and are not suitable to be manufactured by micromachining techniques. Such conventional microphones include electrodes and a diaphragm. The mechanical properties of the diaphragm determine the bandwidth of the microphone.

Although conventional condenser microphones to receive acoustic signals have generally been accepted, such a microphone is relatively large, and not readily suitable for being formed or placed on a semiconductor chip. Further, the conventional condensor microphone requires electrodes and a relatively large bias voltage applied thereto.

It would be desirable to have available a microphone that is substantially free of these and other shortcomings of condenser microphones. This application discloses such a microphone.

SUMMARY OF THE INVENTION

An object of the present invention is to provide a microphone which can be micromachined and is small in size.

Another object of the present invention is to provide a microphone having a broadband and relatively large sensitivity.

It is still another object of the present invention to provide an optical-interference microphone which includes optical components on a silicon chip.

It is still yet another object of the present invention to provide a microphone system which includes a microphone optically connected to an optical circuit.

An aspect of the present invention provides a microphone which includes a diaphragm having a plurality of holes, a back member opposite the diaphragm, and an air gap formed between the diaphragm and the back member. The diaphragm moves in response to an acoustic signal. In a preferred embodiment, the microphone includes an optical fiber having a fiber core, the optical fiber typically being connected to the back member. In another embodiment, the microphone includes a light source and a photodetector for detecting the varying intensity of reflected light due to motion of the diaphragm. The inventive optical-interference microphone is adapted to be formed on a semiconductor chip.

In yet another aspect of the present invention, a microphone system is provided which includes a microphone, an optical circuit, and an optical fiber connecting the microphone with the optical circuit. The optical circuit includes a laser diode, a coupler, an isolator between connecting the laser diode and the coupler, and a photodetector connected to the coupler.

In yet another aspect of the present invention, a sensitive broadband microphone is provided. The microphone is a miniature device, constructed using standard silicon micromachining techniques, and includes a drum type of structure with a diaphragm (membrane) perforated to control ringing. Motion of the diaphragm is sensed using optical interference methods.

In yet another aspect of the present invention, a design is proposed for a micromachined microphone which utilizes optical interference to sense the sound-induced motion of a thin diaphragm. The light source and photodetector can be included as components of the microphone or can be at a remote location and joined to the microphone with an optical fiber. Bandwidth is primarily established by a gap spacing. Further, sensitivity and bandwidth can exceed that of a conventional condenser microphone.

In yet another aspect of the present invention, unlike conventional microphones, the membrane restoring force is not dominated by the tension in the membrane, but instead is due to the compression of the thin layer of gas between the membrane and backing plate. Pneumatic damping, associated with the instantaneous difference in the inside and outside pressures, is used to control ringing and is set by adjusting the porosity of the membrane.

DETAILED DESCRIPTION

Figure 13:
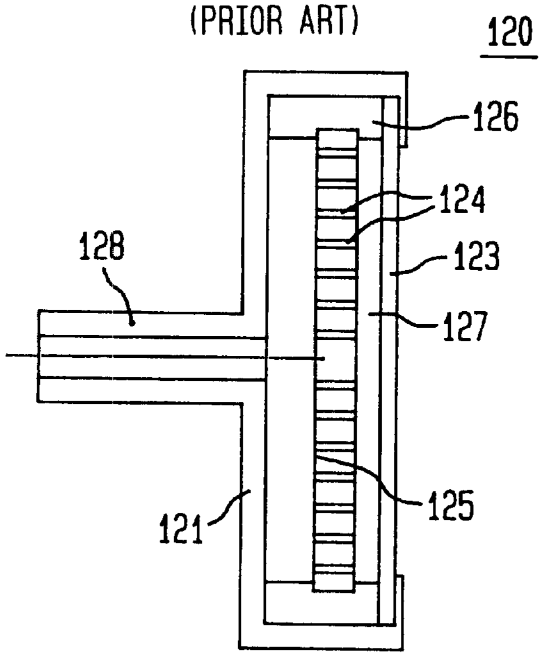
FIG. 13 (PRIOR ART)
FIG. 13 schematically shows a prior art condensor microphone.

FIG. 13 schematically shows an exemplary prior art condenser microphone 120. The microphone comprises a housing 121, diaphragm 123, back plate 125, insulating clamping means 126, and co-axial conductor 128. Numeral 127 refers to the spacing between the diaphragm and the back plate, and numeral 124 refers to holes through the back plate. The space between the diaphragm and back plate form a parallel plate capacitor, with the capacitance depending on the spacing between the two capacitor plates.

Model

Figure 1:
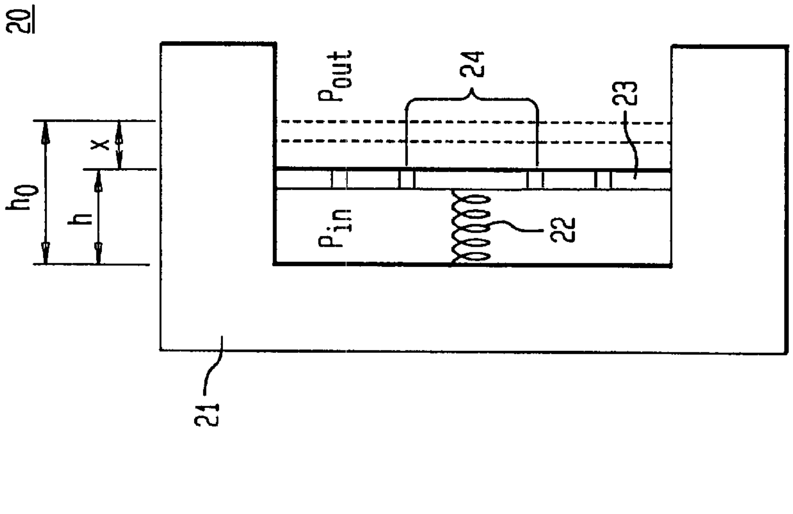
FIG. 1 shows an exemplary embodiment of a model device of the present invention upon which an analysis for exemplary embodiments of the present invention is based.

An analysis is provided below based on a model device (model) 20 as shown in FIG. 1, whose behavior can be described analytically, regarding exemplary embodiments of microphones of the present invention.

The model 20 shown in FIG. 1 is assumed to be small compared to the wavelength of sound at all relevant frequencies so that at any given time the outside pressure $P_{out}$ is uniform over the model 20. The model 20 includes a piston 23 of mass m and cross-sectional area a which is supported within a rigid cylinder 21 by a mechanical spring 22, with spring constant k, at an equilibrium distance $h_o$ away from the bottom of the cylinder 21. The piston 23 moves in response to variations in $P_{out}$. Small holes 24 passing through the piston 23 provide an escape for the gas trapped in the cylinder 21.

The equation of motion for the driven resonator is $$m\ddot{x}=-kx-(P_{in}-P_{out})\alpha-\Gamma\dot{x} \qquad \text{Eq. 1}$$

where $P_{in}$ is the instantaneous pressure inside the cylinder 21, x is the piston's displacement measured from its equilibrium position, and Γ is a damping constant associated with the piston's velocity. When a sound wave of radial frequency ω is incident on the model 20, the outside, time-dependent pressure is given by $$P_{out}=P_o+P_s e^{i\omega t} \qquad \text{Eq. 2}$$

Here $P_o$ is the ambient gas pressure, and $P_s$ is the pressure amplitude of the sound wave.

The rate of gas flow through the holes 24 in the piston is proportional to the instantaneous pressure difference on the two sides of the piston 23

$$\dot{n}=-\xi(P_{in}-P_{out}) \text{ in moles/s.} \qquad \text{Eq. 2.5}$$

In general the constant ξ will depend on many physical parameters, including: the number, size, and physical arrangement of the holes 24 in the piston 23; the gap spacing $h_o$; the ambient gas type and pressure; and the mean free path of the gas molecules. Generally, a quantitative value for this constant will rely on empirical data.

The solution to Eq. 1 is represented by the expressions $$x=Ae^{i(\omega t-\phi_1)} \qquad \text{Eq. 3}$$

and $$P_{in}=P_o+Be^{i(\omega t-\phi_2)}, \qquad \text{Eq. 4}$$

using the relationships of equations 5–8 and the definitions of equations 9–11.

$$\omega_o^2\equiv k/m, \qquad \text{Eq. 9}$$

$$\omega_g^2\equiv\frac{aP_o}{h_o m}, \qquad \text{Eq. 10}$$

$$\frac{1}{\tau}\equiv\frac{P_o\xi}{n_o}=\frac{RT\xi}{ah_o} \qquad \text{Eq. 11}$$

The time constraint τ is the characteristic time associated with the decay of the pressure in the fixed volume $ah_o$.

$$\frac{A}{h_o}\frac{P_o}{P_s}=\frac{\omega_g^2}{\sqrt{1+(\omega\tau)^{-2}}}\left[\omega_o^2+\left(\frac{\omega_g^2}{1+(\omega\tau)^{-2}}-\omega^2\right)^2+\left(\frac{\omega_g^2/\omega\tau}{1+(\omega\tau)^{-2}}\right)^2\right]^{-1/2}. \qquad \text{Eq. 5}$$

$$\tan\varphi_1=\frac{1}{\omega\tau}\cdot\frac{\omega_o^2-\omega^2}{\omega_o^2+\omega_g^2-\omega^2} \qquad \text{Eq. 6}$$

$$\frac{B}{P_s}=\left[\frac{\omega_g^2+\left(\frac{\omega_o^2-\omega^2}{\omega\tau}\right)^2}{(\omega_o^2+\omega_g^2-\omega^2)^2+\left(\frac{\omega_o^2-\omega^2}{\omega\tau}\right)^2}\right]^{1/2}, \qquad \text{Eq. 7}$$

and $$\tan\varphi_1=\frac{1}{\omega\tau}\cdot\frac{(\omega_o^2-\omega^2)^2}{\omega_g^2(\omega_o^2+\omega_g^2-\omega^2)+\left(\frac{\omega_o^2-\omega^2}{\omega\tau}\right)^2}. \qquad \text{Eq. 8}$$

$$\alpha\equiv\frac{1}{\omega_g\tau} \qquad \text{Eq. 12}$$

Plots

Figure 2:
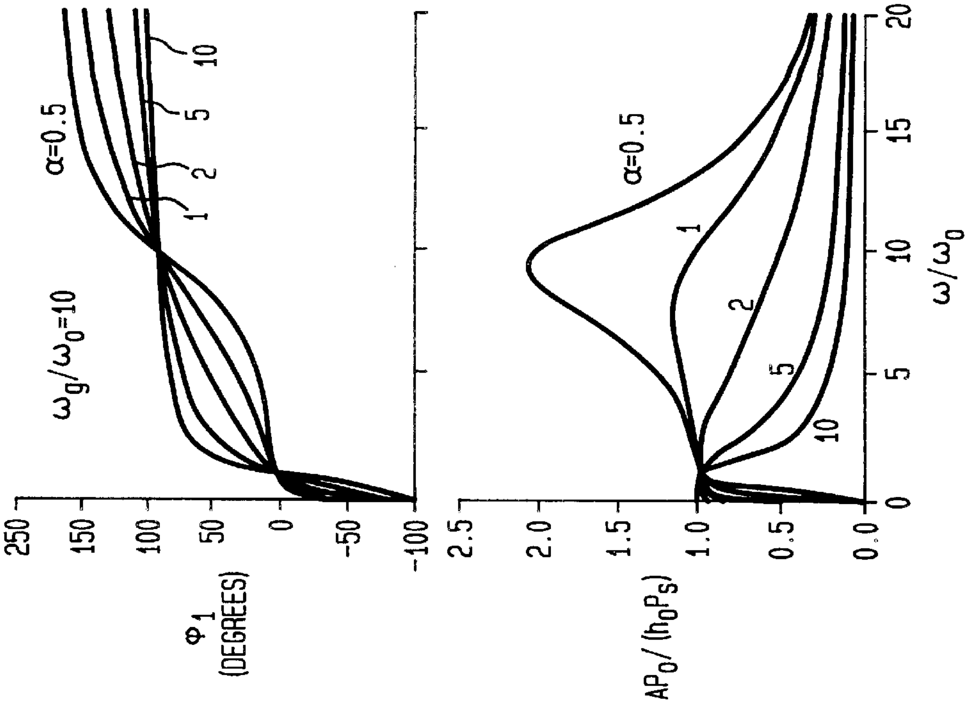
FIG. 2 are graphs respectively showing the amplitude and phase of the piston.

FIG. 2 shows the reduced amplitude and phase determined by Eq. 5 and Eq. 6, respectively, plotted as a function of frequency measured in units of the natural frequency, $\omega_o$. Curves are shown for $\omega_g/\omega_o=10$ and for several values of α (defined by Eq. 12). A small α value corresponds to a piston 23 with a low porosity. For small α there is a peak with a reduced amplitude of approximately 1/α at $\omega/\omega_o=\omega_g/\omega_o$ and for large α a peak with an amplitude of unity at $\omega/\omega_o=1$. Independent of the value of α the phases at these two special frequencies are 90° and 0°, respectively.

Figure 3:
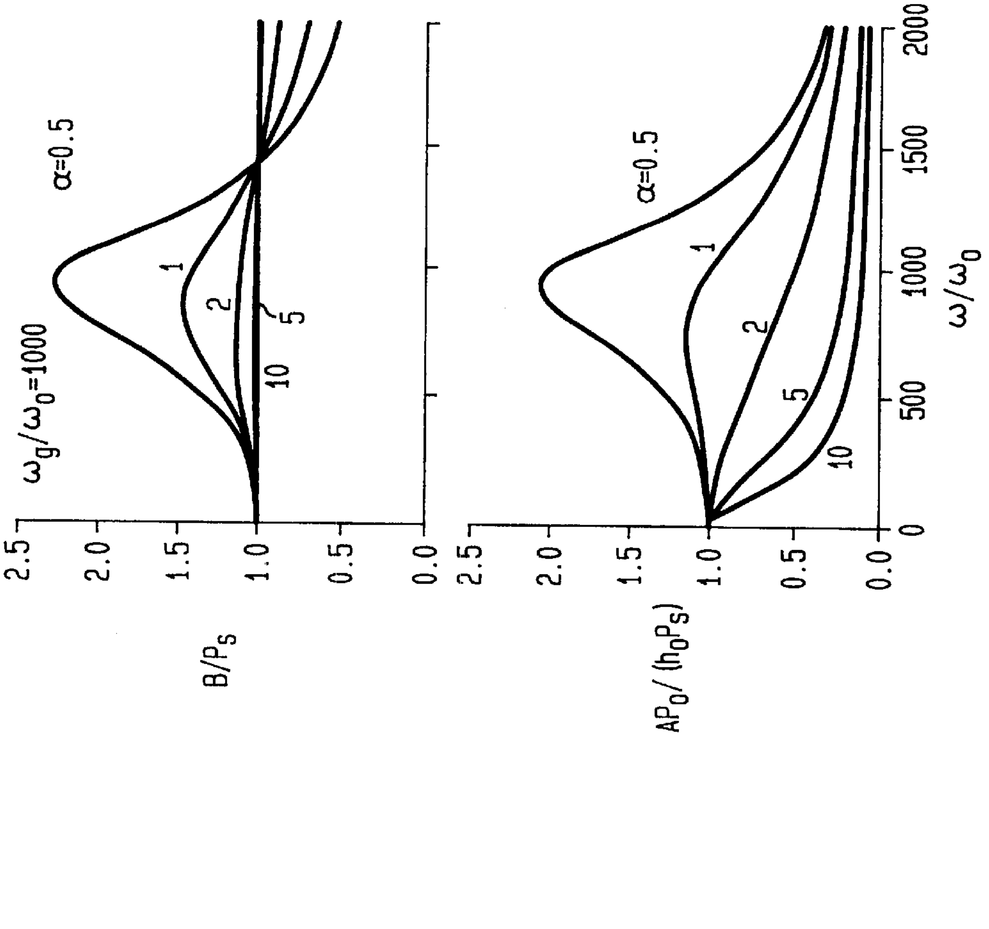
FIG. 3 are graphs respectively showing the amplitude of a piston and amplitude of a cylinder pressure plotted for $\mathbf{107}_g/\mathbf{107}_o$ fixed at 1000 and for several values of the parameter $\alpha$.

FIG. 3 shows A and B in reduced units versus frequency, now for $\omega_g/\omega_o=1000$. The amplitude A is 0 at zero frequency (not shown). Except for the very-low frequency region and for a resealing of the frequency axis, the curves in FIG. 3 are similar to the corresponding curves shown in FIG. 2. The scaling would be corrected if the frequency was referenced relative to $\omega_g$ instead of $\omega_o$. It is apparent that to avoid resonance and still maintain significant response over the largest possible frequency range requires that α be between approximately 1 and 2. In the following, α=1.5 will be taken as the desired value. To enhance the response at the higher frequencies, a slightly smaller value would be used.

Figure 4:
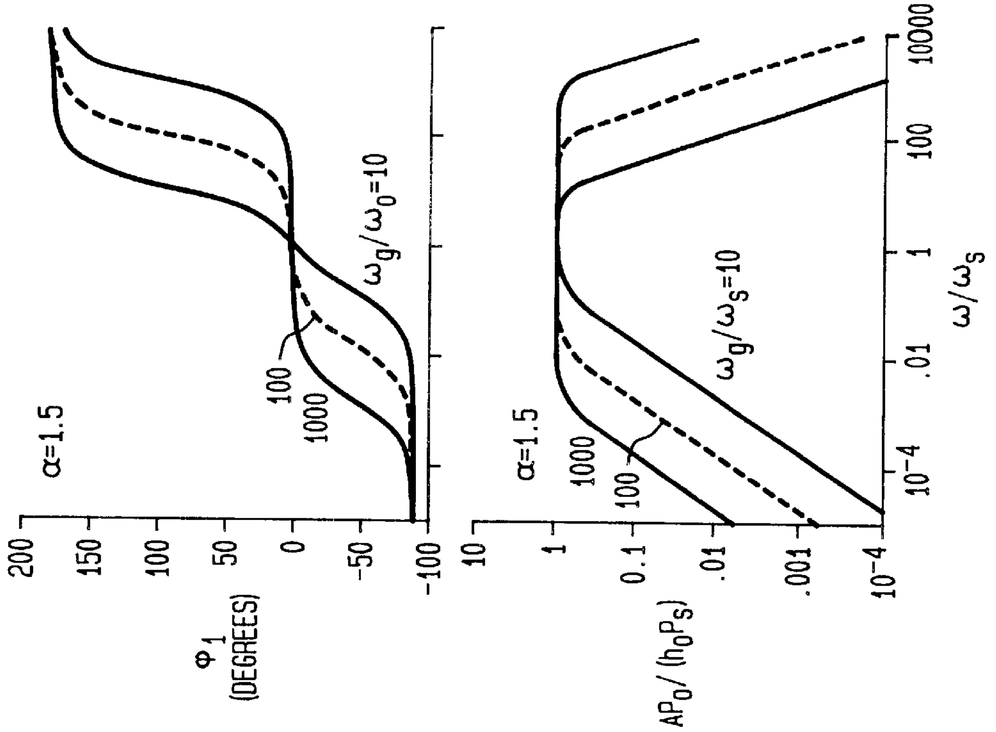
FIG. 4 are graphs respectively showing piston amplitude and phase with optimized damping.

FIG. 4 is a log-log plot showing A and $\phi_1$ versus frequency corresponding to α=1.5 and $\omega_g/\omega_o=10$, 100, and 1000. On a log scale the band pass region is centered at $\omega_o$ and has a width set primarily by $\omega_g$. The frequency band pass region is determined by $$\frac{a}{(\omega_g/\omega_o)} < \frac{\omega}{\omega_o} < \frac{\omega_g}{\omega_o} \quad \text{Eq. 13}$$

or $$f_{min} < f < f_{max} \quad \text{Eq. 14}$$

with $$f_{\min} = \frac{\alpha f_o^2}{f_g} \quad \text{Eq. 15}$$

and $$f_{max} = f_g \quad \text{Eq. 16}$$

If, for example, $f_o$=1 kHz and $f_g$=1 MHz then the band pass is from approximately 1 Hz to 1 MHz.

Figure 5:
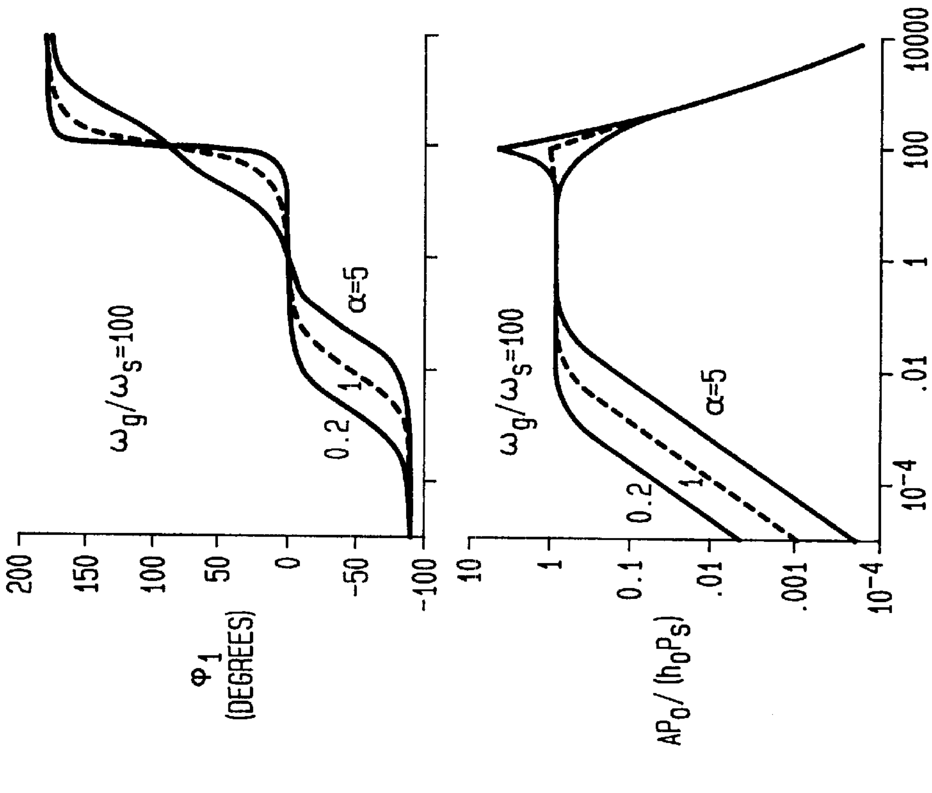
FIG. 5 are graphs respectively showing piston amplitude and phase with non-optimized damping and for $\mathbf{107}_g/\mathbf{107}_o$= 100.

FIG. 5 shows the consequences of a deviating from near unity. Using an α value smaller than one (porosity too small) pushes the low end of the band to lower frequencies, in agreement with Eq. 13, but gives rise to a resonance peak at the upper end of the band. Using an α value larger than one (porosity too large) shrinks the band pass from both ends.

Numerical Estimates for $f_g$, $f_o$, and τ

A. The Parameter $f_g$

If the piston 23 has uniform thickness t and density ρ, its mass m is given by atρ, and Eq. 10 can be written $$f_g = \frac{1}{2\pi}\sqrt{\frac{P_o}{h_o t\rho}}. \quad \text{Eq. 17}$$

A common material for a micromachined membrane (diaphragm) 23, is silicon nitride which has a density of about 3.1 gm/cm$^3$. Using this density and $P_o$=10$^5$ Pa, Eq. 17 becomes $f_g$=0.904$t^{-½}h_o^{-½}$, with $f_g$ in MHz and $h_o$ and t in μm. Since $h_o$, for a micromachined device 20 generally will be less than a few μm, $f_g$ typically will be of the order of a few MHz and much larger than the natural frequency $f_o$.

Figure 12:
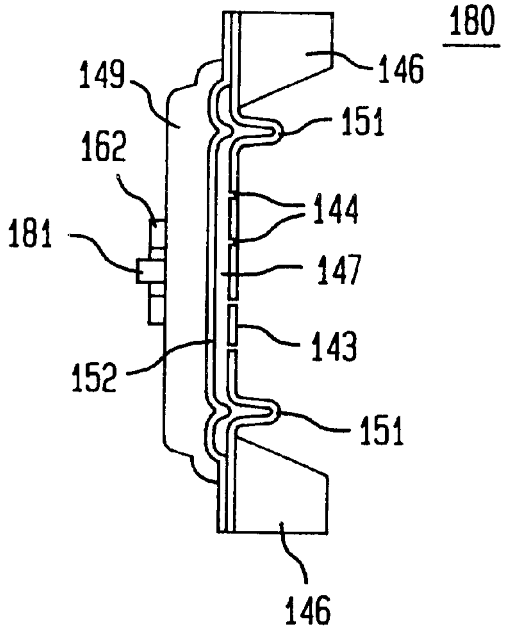
FIG. 12 is an exemplary embodiment of an optical-interference microphone of the present invention with a light source and photodetector as integral components thereof.

The structure of exemplary embodiments of microphones of the present invention discussed below include a porous membrane such as a diaphragm 143 shown in FIGS. 9 and 12 closing a cylindrical cavity. Because gas compression dominates the restoring force (except at very-low frequencies), the membrane 143 will undergo a piston-like motion over most of the membrane area. Accordingly, Eq. 17 is appropriate for estimating $f_g$. At the lowest frequencies, the properties of the diaphragm 143 are important, and Eq. 9 for $f_o$ is modified accordingly.

B. The Parameter $f_o$

The restoring force for a drumhead in vacuum is due both to the tension and to the bending moments in the diaphragm. When the tension term dominates, the fundamental resonance frequency is determined by $$f_{res} = \frac{0.766}{D}\sqrt{\frac{S}{\rho}}. \quad \text{Eq. 18}$$

If the restoring force is dominated by the bending moments, then $$f_{res} = \frac{1.88t}{D^2}\sqrt{\frac{E}{\rho(1-v^2)}}. \quad \text{Eq. 19}$$

S is the stress, E is Young's modulus, and is Poisson's ratio (typically about 0.3). When both contributions to the restoring force are significant, the resonant frequency is the geometric average of the values determined by Eq. 18 and FIG. 19.

Figure 6:
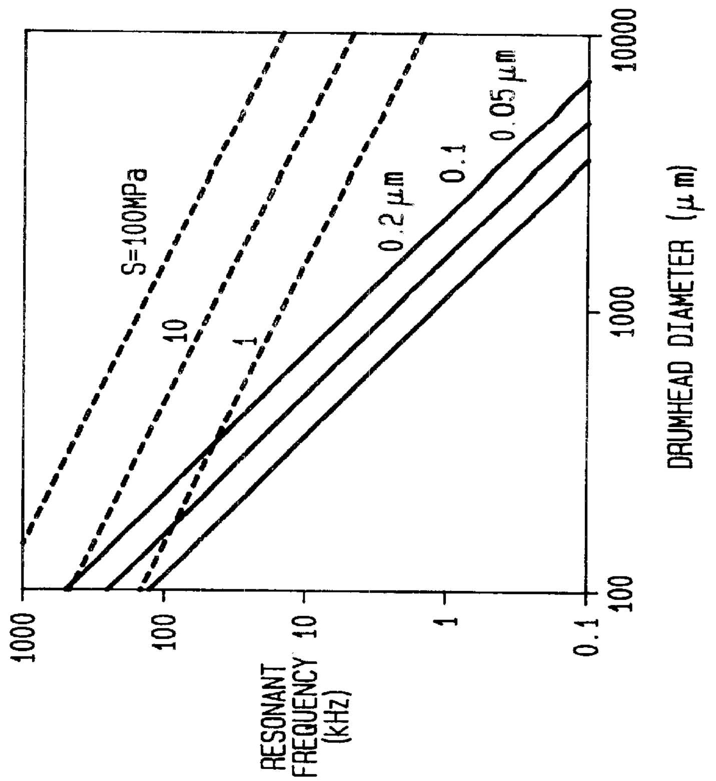
FIG. 6 is a graph showing the relationship between a resonant frequency and drumhead diameter.

The solid lines in FIG. 6 show the v resonant frequency for silicon nitride diaphragms of various thickness computed using Eq. 19 (E=3.85×10$^{12}$ dynes/cm$^2$). The dashed lines show frequencies for various stress levels computed using Eq. 18. Thus, if a resonant frequency of a few kHz is required for a device with a diameter of 1000 μm it will be necessary to reduce the stress to a very low level and to keep the thickness to a few tenths micron. The requirement on the stress may mean that a structure with a built-in stress reliever is necessary. The frequency for a fixed size could also be lowered by adding mass to the diaphragm by, for example, adding a layer of gold.

C. The Parameter τ

Figure 7:
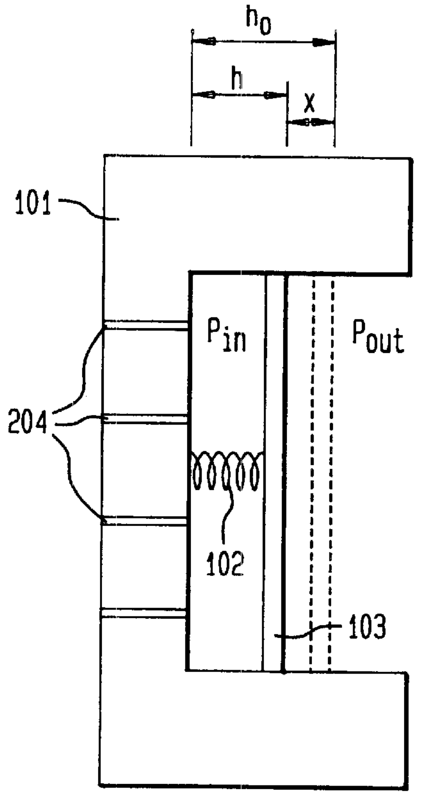
FIG. 7 shows an exemplary embodiment of a model device of the present invention pictured with damping holes in the bottom of the cylinder rather than in the piston.

The time constant τ is a measure of the rate at which gas can escape from the inner cavity of the microphone structure through holes which have been pictured thus far to be in the piston. However, because the device is small compared to the wavelength of sound for all frequencies, the holes can be located anywhere, e.g., through a thick back plate as shown in FIG. 7. This geometry allows for a more-direct estimate of the effective porosity of the escape holes.

The assumptions now are i) that gas flow is limited only by the N holes 23 of diameter d and length l, ii) that l is large compared to d, and iii) that d is large compared to the mean free path of the gas molecules (approximately 0.1 μm at STP). Under these conditions the flow rate is given by the Pouseille relation $$\dot{n} = \left(\frac{NP_o}{RT}\frac{\pi}{128\eta}\frac{d^4}{l}\right)(P_{out} - P_{in}) \quad \text{Eq. 20}$$

and so via Eq. 2.5

$$\xi = \left(\frac{NP_o}{RT}\frac{\pi}{128\eta}\frac{d^4}{l}\right). \quad \text{Eq. 21}$$

The quantity η is the gas viscosity.

Using Eq. 21 along with Eq. 11 relating ξ and 1/τ, and setting 1/τ equal to $\omega_g$ it follows that the number of holes 23 required to achieve critical damping is given by $$\frac{N}{D^2} = \chi f_g \frac{h_o l}{d^4} \quad \text{Eq. 22}$$

with $$x \equiv 64\Pi\pi/P_o \approx 3.6\times10^{-8} \text{ sec.} \quad \text{Eq. 23}$$

The numerical value is based on a viscosity value for air at atmospheric pressure of 18x10$^{-5}$ poise.

The estimate, Eq. 22, for the number of damping holes 23 is valid only if the long narrow holes provide the dominant contribution to the flow resistance, and this implies that $h_0$>>d. For the microphones of interest, however, $h_o$ generally will be smaller than d. Moreover, the condition l>>d will be violated, especially if the holes 23 are placed in the diaphragm. In this embodiment of the present invention, the resistance is associated with the narrow gap spacing $h_o$ and the radial flow of gas toward an opening with cross-sectional area $(\Pi d)h_o$.

The center-to-center spacing between holes can now be estimated using the relation $$\frac{(d_{cc}/h_o)}{d/h_o} - (d_{cc}/h_o)^2 \approx \frac{4\pi}{xf_g}, \quad \text{Eq. 24}$$

where $$x = d/d_{cc} \quad \text{Eq. 25}$$

Figure 8:
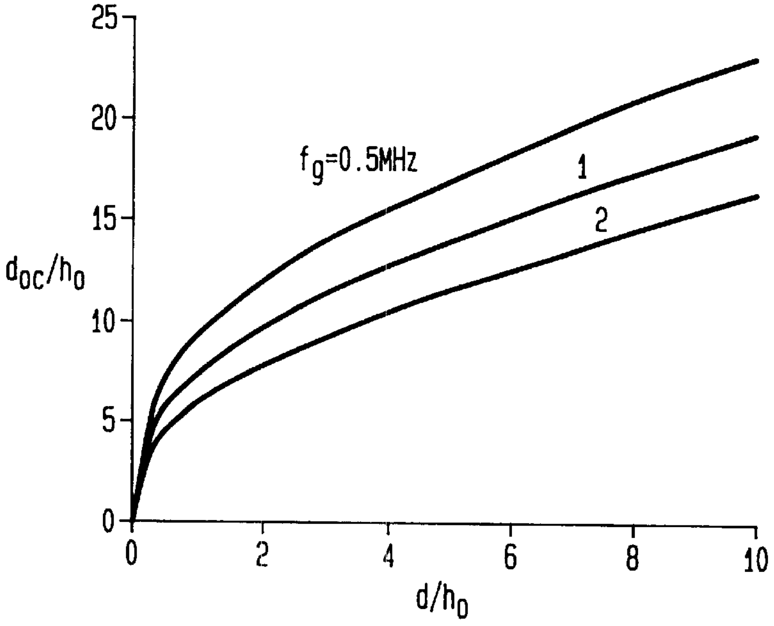
FIG. 8 is a graph showing estimates of the center-to-center spacing of damping holes for an optimally-damped diaphragm, plotted as a function of hole diameter.

This relation determines the center-to-center spacing of holes, given values of $f_g$ and $d/h_o$. FIG. 8 shows $d_{cc}/h_o$ plotted versus $d/h_o$ for $f_g$ fixed at 0.5, 1, and 2 MHz.

If, for example, $h_o$=1 μm and $f_g$=1 MHz, then 5 μm-diameter holes should have a center-to-center spacing of about 15 μm. More-quantitative values for the optimum size and spacing of holes typically will require empirical studies which can use the estimates shown in FIG. 8 as a starting point.

Optical-Interference Microphone

As is known to those skilled in the art, the sensitivity of a conventional condensor microphone decreases with size, such that a microphone of diameter less than about 1 mm is generally not useful. On the other hand, a microphone of diameter less than about 1 mm would be very desirable. For instance, such a microphone would generally not be subject to soundwave phase interference effects. Optical-interference microphones according to our invention can readily be made to have diameter less than 1 mm, and to have sensitivity comparable to that of much larger (e.g., 10 mm diameter) condenser microphones. FIG. 9 schematically depicts an exemplary optical-interference microphone according to the invention.

In an exemplary embodiment of the present invention, the micromachined microphone 150 utilizes optical interference methods to detect the sound-induced motion of a thin membrane 143. A benefit of its very-small physical size is that sound-wave phase interference effects are negligible. Moreover, because the microphone 150 does not require a bias voltage or a local amplifier it can be constructed with no electrical leads attached directly to the transducer. Consequently, there is an immunity to microphonic noise.

Figure 9:
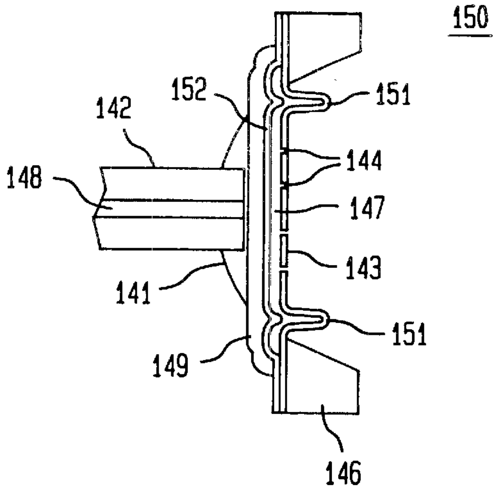
FIG. 9 shows an exemplary embodiment of a microphone of the present invention.

A microphone 150 which includes or is attached to an optical fiber is shown in FIG. 9. The fiber core 148, the bonding cement 141, and the material (typically glass) 149 giving support to the back side (back member) 152 of the microphone in one embodiment, all have substantially the same optical index. In one embodiment of the present invention, the optical index is approximately 1.467. The material directly in contact with the glass support, is silicon nitride, for example, with an index of 2.40 and exemplary thickness λ/4n, where n is the optical index (the retractive index) in an exemplary embodiment of the present invention. The material which constitutes the diaphragm 143 is, exemplarily by, also silicon nitride but with an index of 2.00 and thickness λ/4n. Here λ is the wavelength of light which is directed normal to the layers. The layered structure forms a dielectric mirror with a reflectivity which ranges from about zero to about 77% depending on the gap spacing 147 between the nitride layers. An acoustic signal which causes the diaphragm 143 to move results in a variation in the amount of reflected (or transmitted) light.

Figure 10:
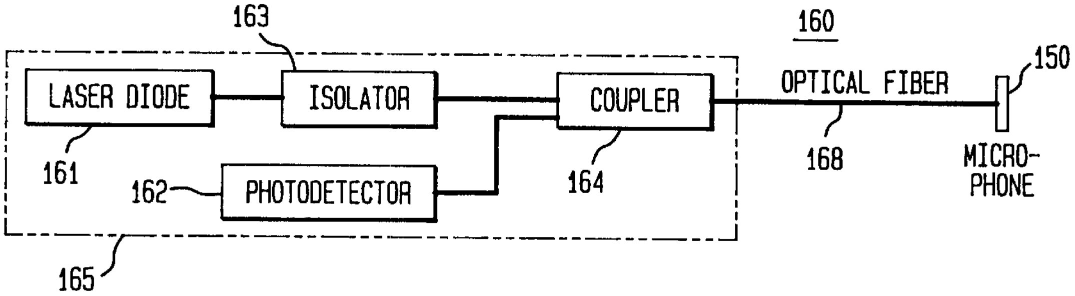
FIG. 10 shows an exemplary optical circuit for a microphone of the present invention.

The microphone 150, which requires no electrical leads at the location of the microphone 150, could be operated as part of the simple optical circuit 165 shown in FIG. 10. In a different embodiment, the amount of light transmitted through the layer structure is measured by placing a photodetector (not shown) in front of the diaphragm 143.

Figure 11:
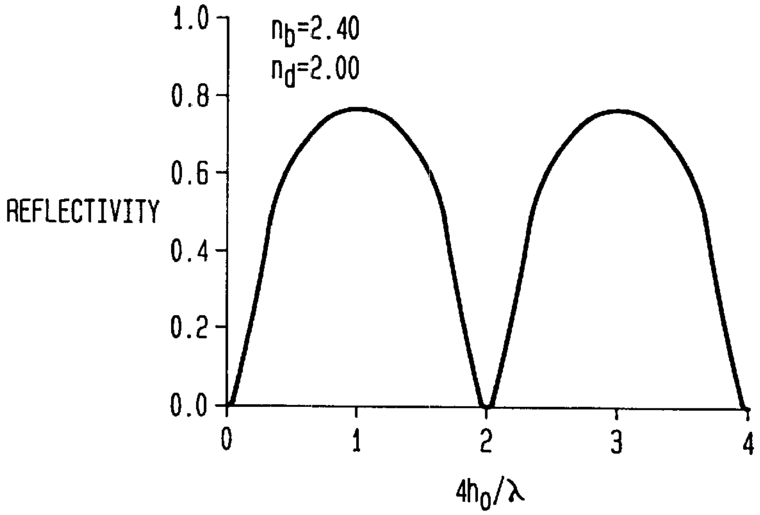
FIG. 11 is a graph showing the relationship between reflectivity and gap spacing for the microphone shown in FIG. 9.

The calculated reflectivity of the layer structure is plotted as a function of gap spacing 147 in FIG. 11. Obviously, the largest change in the amount of reflected light corresponding to a small variation in gap spacing 147 is obtained when the slope of this curve is largest. It is also desirable to operate with a small background level of reflected light. The two conditions are satisfied if, for instance, $$h_o = (m-\gamma)\lambda/4 \quad \text{Eq. 26}$$

with m even, and $$|\gamma| \approx 0.1. \quad \text{Eq. 27}$$

The sensitivity of microphone 150 is computed as follows: The intensity of the light reaching the detector is $$I_D = F \cdot F_{circuit} \cdot L_p \quad \text{Eq. 28}$$

where $L_p$ is the laser power, $F_{circuit}$ is the fraction of the light intensity that would reach the detector if the reflectivity of the device were unity (e.g., if the light passed through a 50—50 coupler twice and there were no other losses, this factor would be 0.25), and F is the fraction of the light intensity incident on the microphone 150 that is reflected back into the fiber 148. The function F has a dc component $F_{dc} = \Re_{h_o}$, and an ac component with amplitude $$F_{ac} = \left.\frac{d\mathcal{R}}{dh}\right|_{h_o} \cdot A = (m_c - \gamma)\frac{\lambda}{4}\frac{P_s}{P_o}\left.\frac{d\mathcal{R}}{dh}\right|_{h_o}, \quad \text{Eq. 29}$$

where $\Re$ is the reflectivity.

If the detector has responsivity $R_D$ (measured in amp/watt) the photo current is $$i_{photo} = R_D I_D = R_D F F_{circuit} P \quad \text{Eq. 30}$$

with the dc and ac components of F as given above.

The current sensitivity of the microphone (in units of amps/Pa) is therefore $$\begin{aligned} M_i &\equiv \frac{di}{dP} \\ &= \frac{i_{photo,ad}}{P_s} = R_D F_{circuit} L_p (m_c - \gamma)\frac{\lambda}{4P_o}\left.\frac{d\mathcal{R}}{dh}\right|_{h_o} \end{aligned} \quad \text{Eq. 31}$$

If the photo current is fed into an amplifier with a transimpedance of $Z_{trans}$ then $$M_v = Z_{trans} \cdot M_i. \quad \text{Eq. 32}$$

For an example, assume that a microphone is constructed with the optics discussed above and that the number and size of damping holes have been adjusted to give optimum physical response. Assume also that $m_c$=6 and γ=0.1 which implies (from Eq. 26)

$$h_o = 1.48\lambda \quad \text{Eq. 33}$$

From FIG. 11

$$\Re_{h_o} \approx 0.08 \quad \text{Eq. 34}$$

and $$\frac{d\mathcal{R}}{d(4h_o/\lambda)} \approx 1.5 \quad \text{Eq. 35}$$

so $$\left.\frac{d\mathcal{R}}{dh}\right|_{h_o} \approx \frac{6}{\lambda}. \quad \text{Eq. 36}$$

If $$F_{circuit} L_p = 1 \text{ mW},$$

$$R_D = 0.6 \text{ amps/watt}, \quad \text{Eq. 37}$$

and $$Z_{trans} = 100\ k\Omega,$$

then $$M_v = 5.3 \times 10^{-3} V/Pa. \quad \text{Eq. 38}$$

This sensitivity of the micromachined microphone 150 is comparable to the sensitivity of a much larger condensor microphone. Further, the sensitivity can readily be increased further by increasing the laser power or the transimpedance of the amplifier.

With $\lambda$=0.65 $\mu$m, $h_o$ (using Eq. 33) is 0.962 $\mu$m. If the diaphragm 143 has a thickness of $\lambda/4n_{SiN}$=0.2 $\mu$m then Eg.17 gives $f_g$=2 MHz. Choosing $f_{min}$=80 Hz, requires that $f_o=(f_g f_{min}/\alpha)^{0.5}$=10 kHz and this implies D=500 $\mu$m (see FIG. 6). The unwanted frequency response above 20 kHz can be eliminated using a low pass electronic filter.

Although FIG. 10 indicates a microphone 150 joined to the coupler 164, isolator 163, light source 161, and detector 162 by an optical fiber 168, a physical separation is not required. Further, there are many applications where one would want these components to constitute a single device, such as a microphone 180, as shown in FIG. 12.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. An article comprising a microphone to be referred to as an optical-interference microphone comprising:

a) a first layer comprising a material that is substantially transmissive for electromagnetic radiation of wavelength $\lambda$;

b) a second layer comprising a material that is substantially transmissive for said electromagnetic radiation, the first and second layers being spaced apart and defining a gap volume between said first and second layers;

c) at least one of the first and second layers comprising a plurality of through-holes disposed therein such that said gap volume is in pneumatic communication with an ambient atmosphere having a pressure, such that a spacing between said first and second layers varies in response to changes in the ambient atmosphere pressure;

d) the article further comprising a source of said electromagnetic radiation of said wavelength $\lambda$ and a detector for detecting said electromagnetic radiation of said wavelength $\lambda$, said source and detector being disposed such that at least a portion of said electromagnetic radiation of said wavelength $\lambda$ that is emitted by said source is transmitted through said gap volume and impinges on the detector, with an intensity of the impinging electromagnetic radiation being responsive to the variations in the spacing between the first and second layers.

2. Article according to claim 1, wherein said source of electromagnetic radiation is spaced from the optical-interference microphone, with said electromagnetic radiation being transmitted to the said microphone through a first optical fiber.

3. Article according to claim 2, wherein said detector is spaced from the optical-interference microphone, and said electromagnetic radiation is transmitted from said microphone to the detector through at least a portion of the first optical fiber.

4. Article according to claim 2, wherein the article further comprises an optical fiber coupler for separating the electromagnetic radiation that is propagating through the first optical fiber from the source of electromagnetic radiation to the optical-interference microphone from the electromagnetic radiation that is propagating through the first optical fiber from said microphone towards the detector.

5. Article according to claim 1, wherein at least one of the source of electromagnetic radiation and the detector are disposed on the optical-interference microphone.

6. Article according to claim 1, wherein said changes in the ambient atmosphere pressure are an acoustical signal.

7. Article according to claim 1, wherein said detector is spaced from the optical-interference microphone, with said electromagnetic radiation being transmitted from said microphone to the detector through optical fiber.

8. Article according to claim 1, wherein at least one of said first and second layers consists of material selected from the group consisting of silicon and silicon nitride.

* * * * *